United States Patent
Sugimoto et al.

(10) Patent No.: US 9,520,702 B2
(45) Date of Patent: Dec. 13, 2016

(54) CLAMP-INTEGRATED WIRING HARNESS PROTECTOR FOR ASSEMBLING AND METHOD FOR PRODUCING THE SAME

(71) Applicant: Yazaki Corporation, Tokyo (JP)

(72) Inventors: Masahisa Sugimoto, Susono (JP);
Makoto Katsumata, Susono (JP);
Kyohei Oda, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/493,524

(22) Filed: Sep. 23, 2014

(65) Prior Publication Data
US 2015/0014490 A1 Jan. 15, 2015

Related U.S. Application Data

(63) Continuation of application No. PCT/JP2013/001869, filed on Mar. 19, 2013.

(30) Foreign Application Priority Data

Mar. 23, 2012 (JP) .................................. 2012-067120

(51) Int. Cl.
*H02G 3/04* (2006.01)
*H02G 3/34* (2006.01)
(Continued)

(52) U.S. Cl.
CPC ........... *H02G 3/0468* (2013.01); *B29C 51/265* (2013.01); *F16L 3/08* (2013.01);
(Continued)

(58) Field of Classification Search
CPC .... H02G 3/0468; H02G 3/34; B29K 2101/00; F16L 3/08; F16L 3/1222
(Continued)

(56) References Cited

U.S. PATENT DOCUMENTS 4,443,031 A * 4/1984 Borsh ................. F16L 25/0045
285/419
4,877,224 A * 10/1989 Watts .................... E01F 15/141
114/219
(Continued)

FOREIGN PATENT DOCUMENTS

CN 1516786 A 7/2004
EP 1482229 A1 12/2004
(Continued)

OTHER PUBLICATIONS

International Search Report and Written Opinion mailed Sep. 23, 2013, issued for PCT/JP2013/001869.
(Continued)

*Primary Examiner* — Anita M King
(74) *Attorney, Agent, or Firm* — Locke Lord LLP

(57) ABSTRACT

An object of the present invention is to provide a clamp-integrated wiring harness protector for assembling, in which a man-hour for assembling the protector is unnecessary, and workability upon assembling with a wiring harness is satisfactory, and the wiring harness is protected after assembling, and the protector can be produced at low cost. The clamp-integrated wiring harness protector for assembling including: a sheet-shaped portion; and a clamp portion integrally formed with the sheet-shaped portion.

3 Claims, 4 Drawing Sheets

(51) Int. Cl.
*B29C 51/26* (2006.01)
*F16L 3/08* (2006.01)
*F16L 3/12* (2006.01)
*H02G 1/06* (2006.01)
*H02G 1/14* (2006.01)
*B29K 101/00* (2006.01)

(52) U.S. Cl.
CPC .............. *F16L 3/1222* (2013.01); *H02G 1/06* (2013.01); *H02G 3/34* (2013.01); *B29K 2101/00* (2013.01); *H02G 1/145* (2013.01)

(58) Field of Classification Search
USPC .......................................... 248/74.1; 174/135
See application file for complete search history.

(56) References Cited

U.S. PATENT DOCUMENTS

| | | | | |
|---|---|---|---|---|
| 4,918,261 A * | 4/1990 | Takahashi | ................ | F16L 3/23 174/135 |
| 5,345,972 A * | 9/1994 | Goglio | ................ | F16L 55/175 138/167 |
| 5,739,470 A * | 4/1998 | Takeda | ................ | H02G 3/0487 174/101 |
| 5,820,082 A * | 10/1998 | Wright | ...................... | F16L 3/08 248/65 |
| 5,962,814 A * | 10/1999 | Skipworth | .......... | B60R 16/0215 174/135 |
| 6,087,593 A * | 7/2000 | Skipworth | .......... | B60R 16/0215 174/135 |
| 6,395,986 B1 | 5/2002 | Gust et al. | | |
| 6,561,465 B2 * | 5/2003 | Kondo | .................. | F16L 3/1025 174/135 |
| 7,387,138 B2 * | 6/2008 | Rice | ..................... | F16L 55/1686 138/97 |
| 7,690,691 B2 * | 4/2010 | Kurdziel | ................. | F16L 21/06 285/230 |
| 2005/0126094 A1 | 6/2005 | Shimizu | | |
| 2014/0027147 A1 * | 1/2014 | Yamamoto | ........... | H02G 3/0462 174/68.3 |
| 2014/0151514 A1 * | 6/2014 | Asai | ..................... | B60R 16/0215 248/74.1 |
| 2014/0196929 A1 * | 7/2014 | Okuhara | .............. | H02G 3/0468 174/68.3 |

FOREIGN PATENT DOCUMENTS

| | | |
|---|---|---|
| JP | S61-121924 A | 6/1986 |
| JP | H09-35540 A | 2/1997 |
| JP | 11-187536 A | 7/1999 |
| JP | 11-270750 A | 10/1999 |
| JP | 2006-254576 A | 9/2006 |
| JP | 2010-266050 A | 11/2010 |

OTHER PUBLICATIONS

Office Action mailed on Mar. 1, 2016 issued for corresponding Japanese Patent Application No. 2012-067120.
Office Action mailed on Nov. 10, 2015 issued for corresponding Japanese Patent Application No. 2012-067120.
Office Action dated Jun. 3, 2016 issued for corresponding Chinese Patent Application No. 2013 800 16029.2.

* cited by examiner

FIG. 3
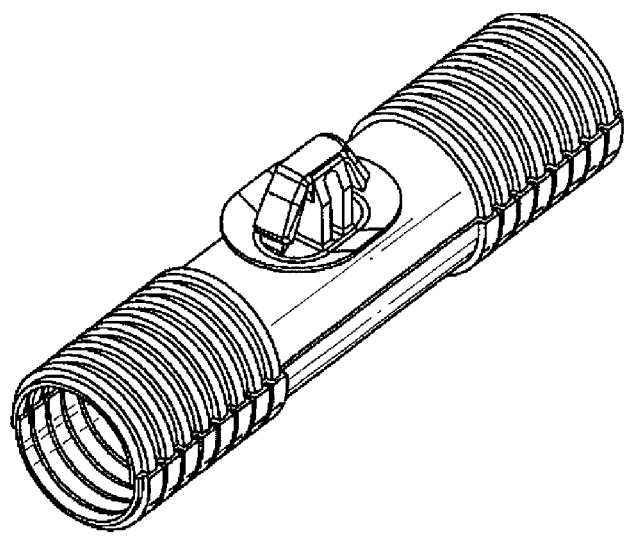
FIG. 4A  FIG. 4B  FIG. 4C
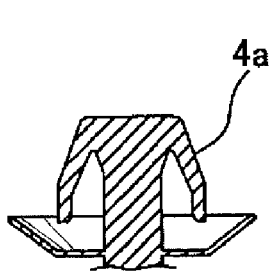
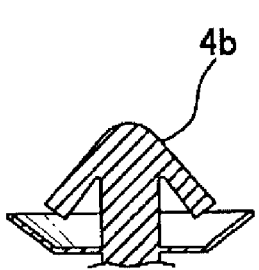
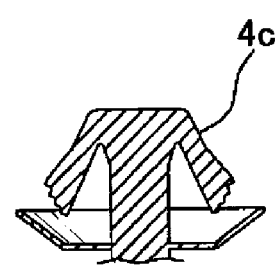

CLAMP-INTEGRATED WIRING HARNESS PROTECTOR FOR ASSEMBLING AND METHOD FOR PRODUCING THE SAME

TECHNICAL FIELD

The present invention relates to a clamp-integrated wiring harness protector for assembling used for attaching a wiring harness to a vehicle body.

BACKGROUND ART

Conventionally, a corrugate tube or the like is used for keeping a wiring harness composed of a plurality of electric wires in a convergent shape, for protecting the wiring harness from friction with a vehicle body or the like, and for preventing the wiring harness from breaking due to folding.

However, generally, it is not easy to insert a bundle of electric wires into a tube because the wiring harness is long. Therefore, as shown in FIG. 6, it is proposed that a sheet-shaped member made by opening the tube is used as a harness protector B for wrapping around the wiring harness (JP, A, H11-187536(PTL 1)).

The harness protector shown in FIG. 6 is made by extrusion-molding thermoplastic resin. The harness protector is integrally provided with a plurality of triangular-sectional-shaped locking teeth 21_arranged around one end of a sheet-shaped protector main body 10, Such a harness protector is fixed to the wiring harness by wrapping the sheet shaped protector main body 10 around the wiring harness, then inserting the bands 20 into the support frames 20 of the band cranks 30, and locking the locking teeth 30 with the locking claw 31.

Further, it is proposed that a clamp for inserting into and locking with a locking hole provided on a vehicle body or the like is provided on a tube or a wrapping sheet (JP, A, H11-270750 (PTL 2), JP, A, 2006-254576 (PTL 3)). Because the wiring harness is fixed to a specific position by such a clamp, a protecting function and a trouble preventing function are improved.

However, there are problems that a molding cost (including a molding die cost) may be increased, and a man-hour may be needed for assembling using such a clamp.

CITATION LIST

Patent Literature

[PTL 1]
JP, A, H11-187536
[PTL 2]
JP, A, H11-270750
[PTL 3]
JP, A, 2006-254576

SUMMARY OF INVENTION

Technical Problem

An object of the present invention is to solve the above problems, namely, to provide a clamp-integrated wiring harness protector for assembling, in which a man-hour for assembling the protector is unnecessary, and workability upon assembling with a wiring harness is satisfactory, and the wiring harness is protected after assembling, and the protector can be produced at low cost.

Solution to Problem

For achieving the above object, according to a first aspect of the present invention, there is provided a clamp-integrated wiring harness protector for assembling, including:
 a sheet-shaped portion; and
 a clamp portion integrally formed with the sheet-shaped portion.

According to a second aspect of the present invention, there is provided the clamp-integrated wiring harness protector for assembling as described in the first aspect, comprising:
 a first semi-cylindrical member with which the clamp portion is integrally formed; and
 a second semi-cylindrical member formed of a resin sheet.

According to a third aspect of the present invention, there is provided the clamp-integrated wiring harness protector for assembling as described in the first or second aspect, wherein the protector is made by thermoforming.

According to a fourth aspect of the present invention, there is provided a method for producing the clamp-integrated wiring harness protector for assembling as described in any one of the first to third aspect, including the step of:
 thermoforming with a molding die to obtain the protector,
 wherein the molding die is divided to a plurality of partial molding dies in a longitudinal direction of a wiring harness to be held by the protector, and the partial molding dies are combined to compose the molding die, and
 wherein at least one of the partial molding dies has a clamp forming portion.

According to a fifth aspect of the present invention, there is provided the method as described in fourth aspect,
 wherein at least one of the partial molding dies is used for forming a corrugate-shaped portion.

Advantageous Effects of Invention

According to the clamp-integrated wiring harness protector for assembling of the present invention described in the first aspect, because the other members such as a clamp with a belt are not used, workability upon assembling to the wiring harness is improved.

Further, by integrating the clamp with the protector, a displacement of the wiring harness upon assembling to a vehicle is prevented, thereby, an attachment property is improved, and a reduction of a product property of the wiring harness after assembling to a vehicle is prevented at the same time.

According to the clamp-integrated wiring harness protector for assembling as described in the second aspect, the protector can be particularly used with a thick wiring harness.

According to the clamp-integrated wiring harness protector for assembling as described in the third aspect, a molding cost (including a molding die cost) is drastically lower than an injection molding cost.

According to the method for producing the clamp-integrated wiring harness protector for assembling as described in the fourth aspect, due to a combination of the partial molding dies, various types of the clamp-integrated wiring harness protector for assembling can be molded, for example, a position of the clamp or the number of the clamps is varied. In this case, a production cost of the molding die is relatively decreased.

According to the method as described in the fifth aspect, a corrugate-shaped portion which is bent freely can be disposed in a desired position. Further, by increasing the number of the partial molding dies for the corrugate-shaped portion, the clamp-integrated wiring harness protector for assembling having a desired number of the corrugate-shaped portions and a desired length of the corrugate-shaped portion can be produced.

BRIEF DESCRIPTION OF DRAWINGS

FIG. 3 is a perspective view showing the other embodiment of the clamp-integrated wiring harness protector for assembling according to the present invention.

FIG. 4A is a sectional view showing an embodiment 4a of a shape of a clamp portion.

FIG. 4B is a sectional view showing an embodiment 4b of the shape of the clamp portion.

FIG. 4C is a sectional view showing an embodiment 4c of the shape of the clamp portion.

DESCRIPTION OF EMBODIMENTS

A clamp-integrated wiring harness protector for assembling according to the present invention will be explained with reference to Figures.

Figure 1A:
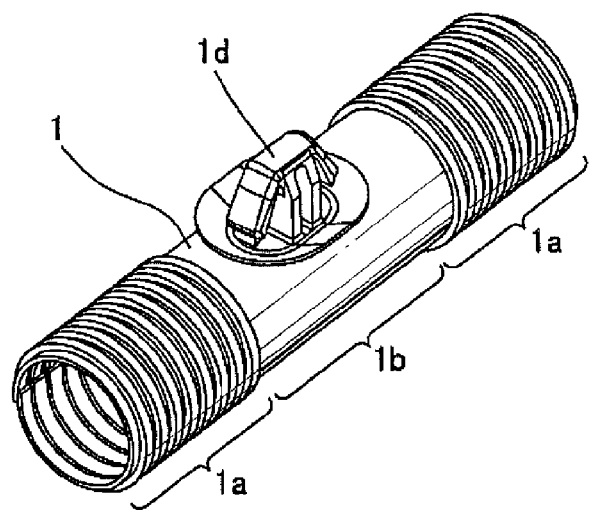
FIG. 1A is a perspective view showing a whole extent of an embodiment of a clamp-integrated wiring harness protector for assembling according to the present invention.
Figure 1B:
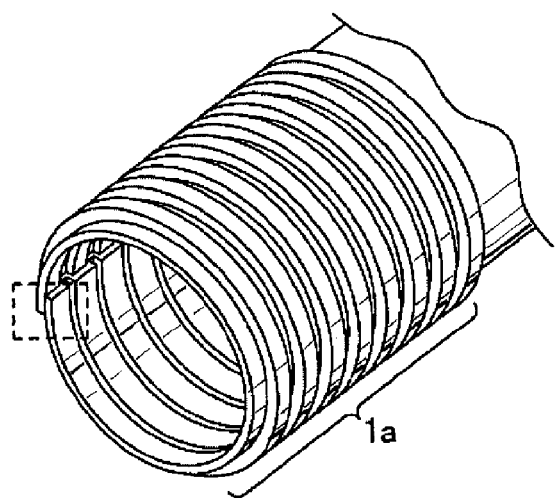
FIG. 1B is an enlarged perspective view showing a front portion of FIG. 1A.
Figure 1C:
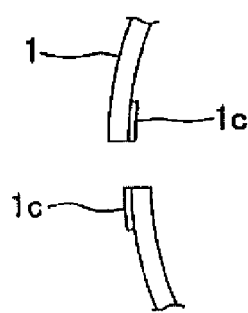
FIG. 1C is a sectional view taken around a portion surrounded by a broken line in FIG. 1B.

FIG. 1A is a perspective view showing a whole extent of an embodiment of a clamp-integrated wiring harness protector for assembling according to the present invention. FIG. 1B is an enlarged perspective view showing a front portion of FIG. 1A. FIG. 1C is a sectional view taken around a portion surrounded by a broken line in FIG. 1B.

In FIG. 1, reference sign $1d$ denotes a clamp portion for inserting into and locking with a locking hole (not shown) provided on a vehicle body or the like. The clamp portion is integrally formed with a sheet-shaped clamp-integrated wiring harness protector for assembling 1 which is curved in a cylinder shape. In this clamp-integrated wiring harness protector for assembling 1, a neighborhood of the clamp portion $1d$ is formed in an open cylinder shape so as to be a straight tube shape (straight tube portion $1b$), and both sides of the clamp portion are formed in a corrugate shape (corrugate tube portion $1a$) having a plurality of ridges.

This clamp-integrated wiring harness protector for assembling 1 is made by pressure-forming a resin sheet. An adhesive portion $1c$ on which adhesive agent layers are laminated is provided on an overlapping portion of both ends in a circumferential direction of the clamp-integrated wiring harness protector for assembling 1 so as to surely hold a wiring harness upon wrapping around the wiring harness. In this embodiment, the adhesive portion $1c$ is provided on two locations, however, the adhesive portion $1c$ may be provided on one location. Further, in the above embodiment, the cylindrical shape is maintained by an adhesive force between the adhesive agent layers, however, the cylindrical shape may be maintained by heat sealing.

Figure 2A:
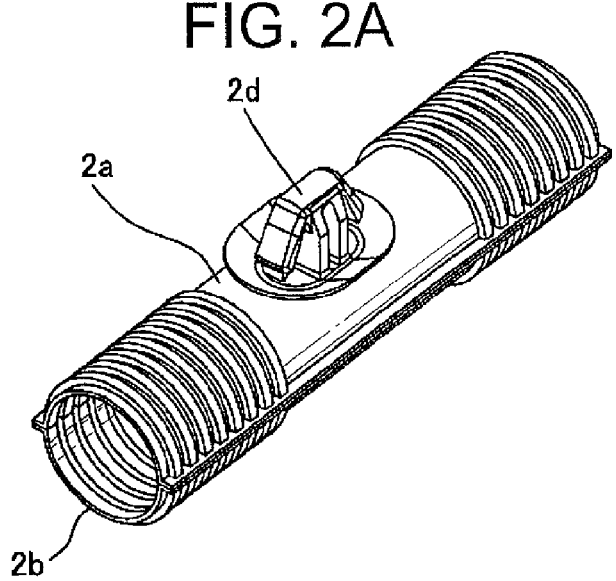
FIG. 2A is a perspective view showing a whole extent of another embodiment of the clamp-integrated wiring harness protector for assembling according to the present invention.
Figure 2B:
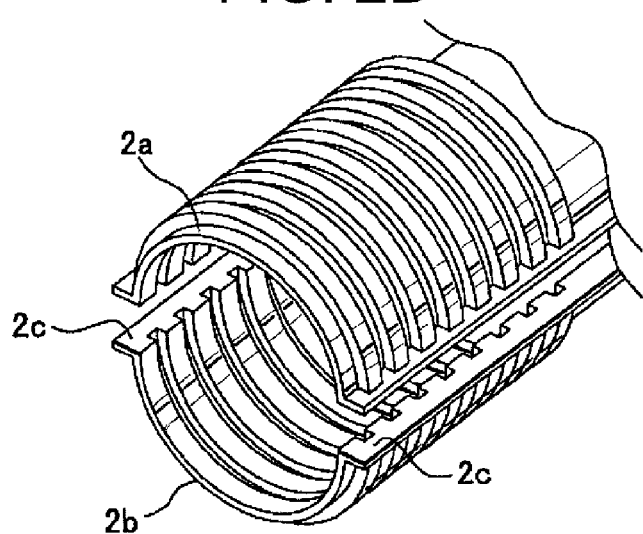
FIG. 2B is an enlarged perspective view showing a front portion of FIG. 2A.
Figure 2C:
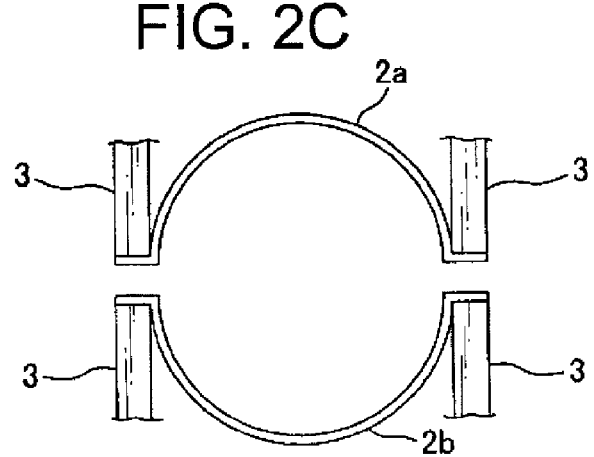
FIG. 2C is a sectional view showing two semi-cylindrical members to be heat-sealed together.

FIG. 2A is a perspective view showing a whole extent of another embodiment of the clamp-integrated wiring harness protector for assembling according to the present invention. FIG. 2B is an enlarged perspective view showing a front portion of FIG. 2A. FIG. 2C is a sectional view showing two semi-cylindrical members to be heat-sealed together.

In FIG. 2, reference sign $2d$ denotes the clamp portion made by thermoforming integrally with a semi-cylindrical member $2a$. Further, reference sign $2b$ denotes another semi-cylindrical member having no clamp portion. The clamp-integrated wiring harness protector for assembling is composed of these semi-cylindrical members $2a$, $2b$. Incidentally, in this clamp-integrated wiring harness protector for assembling also, the neighborhood of the clamp portion $2b$ is a straight tube portion, and both sides of the clamp-integrated wiring harness protector for assembling are corrugate tube portions.

Planar portions $2c$ are formed on both ends in a circumferential direction of these semi-cylindrical members $2a$, $2b$. When the adhesive agent layer is provided on the planar portion $2c$ and the planer portions $2c$ are stuck together, this clamp-integrated wiring harness protector for assembling can be used similar to the clamp-integrated wiring harness protector for assembling 1 shown in FIG. 1. As shown in FIG. 2C (wiring harness is not shown), after the planer portions $2c$ of the semi-cylindrical members $2a$, $2b$ are overlapped with each other, when the planer portions $2c$ are sealed by a heated sealer 3, the wiring harness can be surely held.

In the embodiment shown in FIGS. 2A to 2C, because the planer portion $2c$ is provided, the flexibility of the clamp-integrated wiring harness protector for assembling is reduced in a horizontal direction. In an embodiment shown in FIG. 3, the planer portion $2c$ is not provided, and because the side surfaces of upper and lower semi-cylindrical members are heat-sealed together, the flexibility of the clamp-integrated wiring harness protector for assembling in the horizontal direction is not limited.

FIGS. 4A to 4C show embodiments $4a$, $4b$, $4c$ of a shape of the clamp portion integrally formed with a sheet portion by thermoforming the thermoplastic resin sheet.

Figure 5:
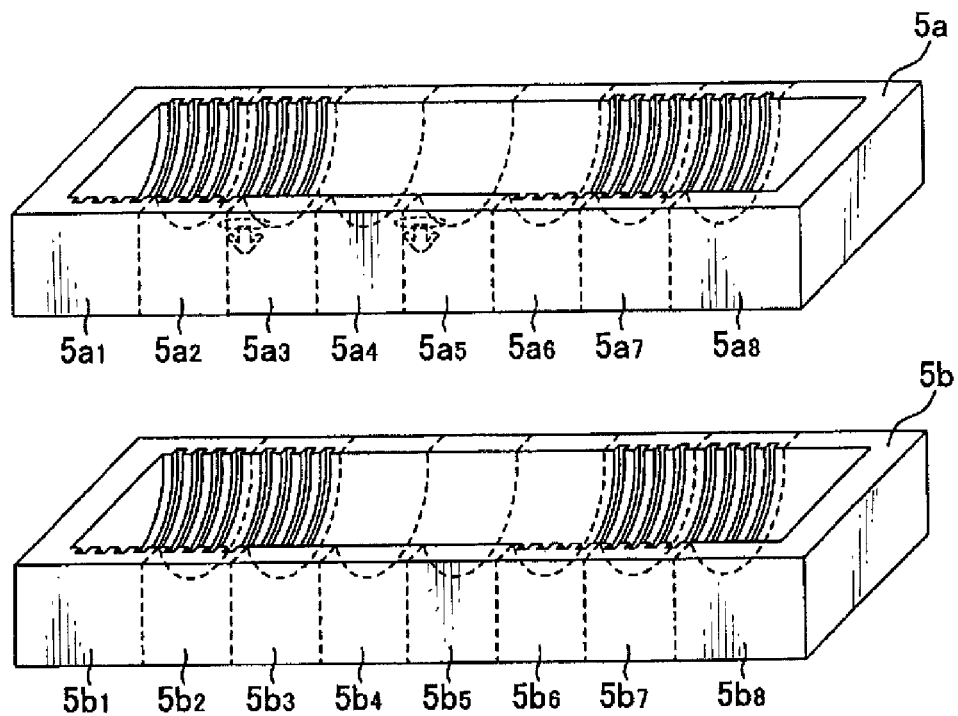
FIG. 5 is a perspective view showing an embodiment of a molding die for forming the clamp-integrated wiring harness protector for assembling.
Figure 6:
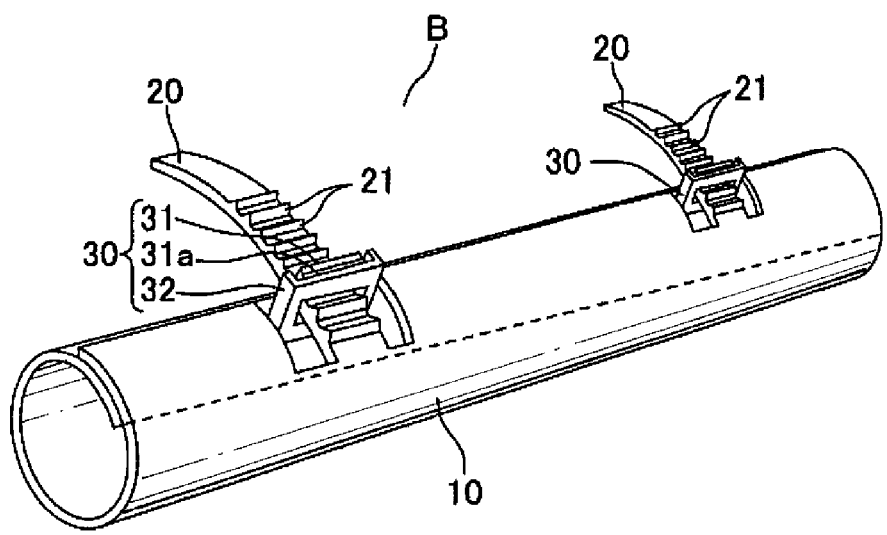
FIG. 6 is a perspective view showing an embodiment of a conventional harness protector.

FIG. 5 shows one embodiment of a molding die for the clamp-integrated wiring harness protector for assembling composed of two semi-cylindrical members.

A molding die $5a$, namely, a portion for forming the thermoplastic sheet by thermoforming (a concave portion in FIG. 5) is divided in a longitudinal direction of a wiring harness which is to be held by the clamp-integrated wiring harness protector for assembling, namely in a horizontal direction of FIG. 5 and composed of eight partial molding dies $5a1$ to $5a8$ in this embodiment.

A corrugate tube portion having one end of the clamp-integrated wiring harness protector for assembling (without the clamp portion) is formed with a partial molding die $5a1$. A corrugate tube portion having the clamp portion is formed with a partial molding die $5a2$. A straight tube portion (without the clamp portion) is formed with a partial molding die $5a3$. A straight tube portion having the clamp portion is formed with a partial molding die $5a4$. A corrugate portion (without the clamp portion) is formed with a partial molding die $5a6$ or $5a7$. A straight portion having the other end (without the clamp portion) is formed with a partial molding die 5*a*8. By changing the order and the number of the partial molding dies, various semi-cylindrical members having the camp portions and composing the clamp-integrated wiring harness protector for assembling can be formed. In this embodiment, the number of the semi-cylindrical member having the clamp is two, however, the number may be one or six at a maximum.

In a molding die 5*b*, an assembly of partial molding dies 5*b*1 to 5*b*8 can be changed according to the assembly of the molding die 5*a* so as to form a semi-cylindrical member of a straight tube portion having no clamp portion corresponding to the straight tube portion of the molding die 5*a* with or without the clamp portion and form a semi-cylindrical member of a corrugate tube portion having no clamp portion corresponding to the corrugate tube portion of the molding die 5*a* with or without the clamp portion. Incidentally, an intake hole (upon vacuum forming) and an exhaust hole (upon air-pressure forming) are omitted in these molding dies.

In this way, when a molding die is formed with a combination of several types of partial molding dies, various types of the clamp-integrated wiring harness protectors for assembling can be molded. Incidentally, in the above, the molding die for forming the clamp-integrated wiring harness protector for assembling composed of two semi-cylindrical members is explained. However, when the clamp-integrated wiring harness protector for assembling shown in FIG. 1A is molded, similarly, the molding die can be composed of several types of partial molding dies, and this case is also included in the scope of the present invention.

Further, by using such a molding die, the straight tube portion and the corrugate tube portion can be integrally and simultaneously formed. Therefore, a connecting work between the straight tube portion and the corrugate tube portion which is used in the conventional wiring harness protector becomes unnecessary.

The thermoplastic resin for composing a resin sheet used for producing the clamp-integrated wiring harness protector for assembling may be molded by thermoforming (vacuum forming, air-pressure forming, press molding, or the like). For example, vinyl chloride resin (vacuum forming temperature: about 170 degrees C.), polypropylene resin (vacuum forming temperature: about 160 to 170 degrees C.), polyethylene resin (vacuum forming temperature: about 100 to 110 degrees C.), and the like are included. The thermoplastic resin is selected from them in view of desired moldability, economic efficiency, thermo-stability, light stability, chemical resistance, mechanical property, and the like. For example, heat life temperature at 10000 hours is 95 degrees C. in a case of polypropylene resin, and 80 degrees C. in a case of vinyl chloride resin.

A thickness of the resin sheet in use is determined in view of the above demand characteristics, and normally, more than 0.1 millimeters, and less than 3 millimeters.

When performing the thermoforming, a method is properly selected from vacuum forming, air-pressure forming, press molding, or the like, with its typical molding condition. Among these thermoforming methods, the vacuum forming is fitted to mold the clamp-integrated wiring harness protector for assembling having a structure of the present invention from a sheet material, and is preferable.

REFERENCE SIGNS LIST

1 an embodiment of a clamp-integrated wiring harness protector for assembling according to the present invention
1*a* corrugate tube portion
1*b* straight tube portion
1*c* adhesive portion
1*d* clamp portion
2*a*, 2*b* semi-cylindrical member
2*c* planar portion
4*a*, 4*b*, 4*c* embodiment of a shape of the clamp portion
5*a*, 5*b* molding die
5*a*1, 5*a*2, 5*a*3, 5*a*4, 5*a*7, 5*c*8 partial molding die

The invention claimed is:

1. A clamp-integrated wiring harness protector for assembling, comprising:
   a sheet-shaped portion formed using a thermoplastic resin sheet so as to surround a wiring harness; and
   a clamp portion provided in the sheet-shaped portion for inserting into and locking with a locking hole provided on a vehicle body,
   wherein the clamp portion and the sheet-shaped portion are integrally formed with each other under thermoforming process using the thermoplastic resin sheet, thereby preventing a displacement of the wiring harness upon assembling to a vehicle,
   wherein the sheet-shaped portion includes a first semi-cylindrical member with the clamp portion integrally formed thereon, and a second semi-cylindrical member, and
   wherein both circumferential ends of the first semi-cylindrical member are adhered to or heat sealed to both circumferential ends of the second semi-cylindrical member, respectively.

2. A method for producing the clamp-integrated wiring harness protector for assembling as claimed in claim 1, comprising the step of:
   thermoforming using the thermoplastic resin sheet with a molding die to obtain the protector,
   wherein the molding die is divided to a plurality of partial molding dies in a longitudinal direction of a wiring harness to be held by the protector, and the partial molding dies are combined to compose the molding die, and
   wherein at least one of the partial molding dies has a clamp forming portion.

3. The method as claimed in claim 2, wherein at least one of the partial molding dies is used for forming a corrugate-shaped portion.

* * * * *